United States Patent [19]

Woodruff et al.

[11] Patent Number: 4,506,260
[45] Date of Patent: Mar. 19, 1985

[54] GROUND ASSURANCE CIRCUIT

[75] Inventors: Frederick W. Woodruff; Daniel C. Hughey; William L. Smart, all of Indianapolis, Ind.

[73] Assignee: Ransburg Corporation, Indianapolis, Ind.

[21] Appl. No.: 357,844

[22] Filed: Mar. 15, 1982

[51] Int. Cl.³ .............................................. G08B 21/00
[52] U.S. Cl. .................................. 340/649; 340/651; 340/652; 361/49; 361/50
[58] Field of Search ............... 340/650, 651, 652, 649; 361/42, 47, 48, 49, 50, 46

[56] References Cited

U.S. PATENT DOCUMENTS

| | | | |
|---|---|---|---|
| 3,386,004 | 5/1968 | Dwyer | 361/50 |
| 3,419,756 | 12/1968 | Philibert et al. | 361/48 |
| 3,914,656 | 10/1975 | Hirschhorn et al. | 361/50 X |

Primary Examiner—James L. Rowland
Assistant Examiner—Daniel Myer
Attorney, Agent, or Firm—Barnes & Thornburg

[57] ABSTRACT

A bi-directional system for ensuring that a ground connection is made in a three-wire conductor system including a line "hot" conductor, a line neutral conductor, and a ground conductor includes a circuit for generating direct current potential related to the potential difference between the line "hot" conductor and ground and a second circuit for generating a direct current potential related to the potential difference between the line "hot" conductor and ground. A circuit including a male plug for insertion into a female receptacle includes a first prong for coupling alternatively to the line "hot" conductor or the line neutral conductor, a second prong for coupling alternatively to the line "hot" conductor or the line neutral conductor, and a third prong for coupling to the line ground conductor. Coupling of the first prong to the line "hot" conductor causes the second prong to be coupled to the line neutral conductor and coupling of the first prong to the line neutral conductor causes the second prong to be coupled to the line "hot" conductor. Conductors are provided for coupling the first circuit to the first and third prongs and for coupling the second circuit to the second and third prongs. Each of the first and second circuits includes a Zener diode for sensing the potential across the "hot" and ground conductors and for switching in response to the presence of potential difference, which tends to indicate the presence of ground potential on the ground conductor.

10 Claims, 1 Drawing Figure

U.S. Patent  Mar. 19, 1985  4,506,260
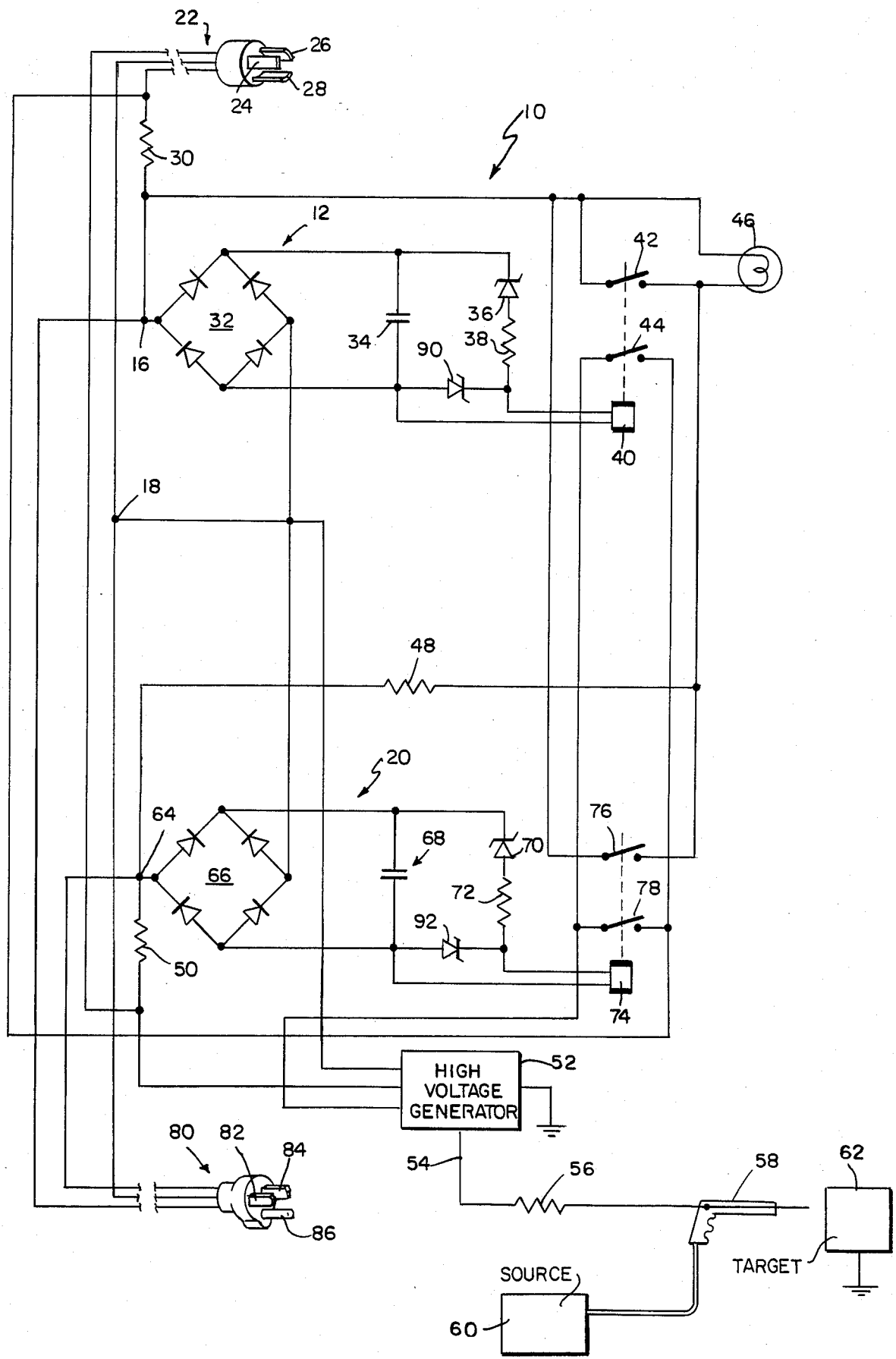

GROUND ASSURANCE CIRCUIT

This invention relates to power supplies, and particularly to a supply for providing electrostatic high potential for charging of particles of coating material as they are dispensed to effect high transfer efficiencies from the atomizing device to a target to be coated.

Atomization and dispensing of atomized and charged coating particles is well known. The benefits to be derived from electrostatically assisted atomization are numerous and proven. Electrostatically aided atomization results in higher transfer efficiency of coating material from a dispensing device to a target properly held at ground or opposite polarity potential to the charged coating material particles. The use of less coating material results, of course, in economy in terms of the amount of coating material used to coat articles, in terms of the amount of pollutants released during the coating of articles (since many coating materials are solvent-borne, and solvents evaporate during the coating process), and in terms of the quality of the finish which can be achieved using electrostatically aided coating. Specifically, most of the coating which is dispensed finds its way to the properly grounded or otherwise electrically prepared target which is intended to be coated. A concomitant phenomenon is that not much of the coating material finds its way onto surrounding equipment and materials. This minimizes the amount of clean-up which must be performed after a coating operation to remove overspray and the like from articles which were not intended to be coated. Therefore, electrostatically aided coating has become a particularly advantageous technique in the industry of on-site refinshing of business furniture (file cabients, desks, and the like). Similarly, electrostatically aided coating has become a favorite technique for achieving high-quality finishes in low-volume applications where economy in the amount of coating material used to achieve acceptable finishes is a prime consideration.

Accordingly, a number of different types of devices have become available commercially for electrostatically aided coating. These types of devices find their way into many coating applications where they are operated by personnel who are perhaps not especially well trained in electrostatically aided atomization techniques and equipment. A major hazard with many of these types of devices in unskilled hands is the hazard of operator shock due to an ungrounded or improperly grounded atomizing device. Occasionally, an operator, in ignorance or disregard of safety instructions and cautionary statements contained on the equipment, will override the internal grounding safety features of the atomizing device by using a three-prong-to-two-prong, or "dummy," adapter plug. Operators in small volume operations or temporary locations frequently resort to this type of misuse when three-conductor female outlets are not available for the equipment, rather than having properly grounded three-conductor female outlets installed. Many concerted efforts have been directed at minimizing the likelihood of such misuse of equipment, including training sessions, teaching literature and the like. However, many instances of misuse still occur. Various types of ground fault detectors are known. There are, for example, the systems of U.S. Pat. Nos. 3,659,152; 3,426,342; 3,320,480; 3,287,603; 3,407,336; and 3,386,004.

According to the invention, a system for ensuring that a ground connection is made in a three-wire conductor system including a line "hot" conductor, a line neutral conductor, and a ground conductor includes means for utilizing current flowing between the line "hot" conductor and the line neutral conductor, and a circuit for coupling the utilization means to the "hot" and neutral conductors. The circuit further includes a circuit for sensing the potential between the "hot" conductor and the ground conductor, the sensing circuit including a Zener diode for switching in response to the presence of voltage across the circuit tending to indicate the presence of ground potential, and means for operating the switch when the Zener diode switches to couple the utilization means to the "hot" and neutral conductors.

According to an illustrative embodiment, an indicator is provided for indicating the presence or absence of ground, along with means for coupling the indicator across the "hot" and neutral conductors. The means for coupling the indicator across the "hot" and neutral conductors includes a second switch. The means for operating the first-mentioned switch also operates the second switch when the Zener diode switches to remove the indicator from circuit to indicate the presence of ground potential. Illustratively, the means for operating the first-mentioned and second switches includes a relay coil.

According to another aspect of the invention, a bidirectional system for ensuring that a ground connection is made in a three-wire conductor system including a line "hot" conductor, a line neutral conductor, and a ground conductor includes first means for generating a direct current potential related to the potential difference between the line "hot" conductor and ground and second means for generating a direct current potential related to the potential difference between the line "hot" conductor and ground. The system further includes a circuit having a first contact for coupling alternatively to the line "hot" conductor or the line neutral conductor, a second contact for coupling alternatively to the line "hot" conductor or the line neutral conductor, and a third contact for coupling to the line ground conductor. Coupling of the first contact to the line "hot" conductor causes the second contact to be coupled to the line neutral conductor and coupling of the first contact to the line neutral conductor causes the second contact to be coupled to the line "hot" conductor. Further means are provided for coupling the first means to the first and third contacts and for coupling the second means to the second and third contacts. The first and second means each includes means for sensing the potential across the "hot" and ground conductors and for switching in response to the presence of potential difference which tends to indicate the presence of ground potential on the ground conductor.

Illustratively, further means are provided for utilizing current flow between the line "hot" conductor and the line neutral conductor. A circuit, including a switch, couples the utilization means to the line "hot" and neutral conductors. The first and second means further include means for operating the last-mentioned switch when the sensing means switches.

According to an illustrative embodiment of this aspect of the invention, the system further comprises an indicator for indicating the presence or absence of ground, means for coupling the indicator across the "hot" and neutral conductors including a second switch, the means for operating the first-mentioned switch also operating the second switch when the sensing means switches to remove the indicator from circuit and indicate the presence of ground potential. Illustratively, this sensing means comprises a Zener diode. The means for operating the first-mentioned and second switches comprises a relay coil. One such first-mentioned switch, one second switch, and one relay coil are associated with each of the first and second means.

The invention may best be understood by referring to the following description and the accompanying drawing which illustrates the invention. Referring now to the drawing, a ground assurance circuit 10 includes a first circuit 12 for generating a direct current potential related to the potential difference between a line "hot" conductor 16 and a ground conductor 18. A second circuit 20 is also provided for generating a direct current potential related to the potential difference between a line "hot" conductor and the ground conductor 18.

Although as illustrated, circuit 20 is not coupled to a line "hot" conductor, it is understood that in the wiring of many buildings, errors are made such that the line "hot" conductor is frequently coupled to the female receptacle for the line neutral conductor and the line neutral conductor is coupled to the female receptacle for the line "hot" conductor. For this reason, the system 10 of the present invention is "bidirectional," that is, it includes two circuits which permit coupling to the main supply, whether the "hot" female receptacle (such as the "hot" female receptacle in a wall plug) is coupled to the "hot" conductor of the main supply or to the neutral conductor of the main supply. The system 10 will function whether the hot conductor is coupled to the hot or neutral female receptacle of a three-receptacle female outlet, as long as the ground receptacle of the female outlet is coupled to a ground.

The system 10 further includes a circuit 22 (illustrated as a 220 volt male plug). Circuit 22 has a first contact 24 for coupling alternatively to the line "hot" conductor or the line neutral conductor, a second contact 26 for coupling alternatively to the line "hot" conductor or the line neutral conductor, and a third contact 28 for coupling to the line ground conductor. Since, as mentioned above, errors can be made in the coupling of the "hot" and neutral conductors to the female receptacle (not shown) into which plug 22 is designed to be placed, male prong 24 can be coupled to the line neutral conductor, which will result in prong 26 being coupled to the line "hot" conductor. If the conductors in the female receptacle are properly connected, power will be supplied through prong 24 and resistor 30 to conductor 16. The voltage variations appearing as a result at conductor 16 will be rectified in the full-wave bridge rectifier 32 and stored in a capacitor 34 coupled across the bridge 32. The reference for the bridge 32 will be the ground appearing on conductor 18 when the plug 22 is installed into a properly grounded female receptacle. This ground will appear at the ground prong 28. The voltage appearing across capacitor 34 under these circumstances will be sufficient to cause Zener breakdown of Zener diode 36 and conduction through resistor 38, relay coil 40 and bridge 32 to the ground conductor 18. Conduction through coil 40 will cause switches 42, 44 to close. Closure of switch 42 will cause an indicator lamp 46 to be removed from the circuit between resistor 30 and the series resistors 48, 50 through which current returns to the line neutral prong 26 of plug 22. Extinguishment of lamp 46 indicates that a proper ground has been achieved through plug 22.

Closure of switch 44, which occurs concurrently with closure of switch 42, couples power from prong 24 and switch 44 to a utilization device 52, illustratively a high voltage generator for generating a high potential on a conductor 54 including a source resistance 56 to a dispensing device 58 for the atomization and dispensing of charged coating material particles from a coating material source 60 onto a target 62 to be coated. The current resulting from the flow of coating material to the target 62 is returned to the high voltage generator 52 through its ground return connection. The power supplied to the high voltage generator from prong 24 is returned through prong 26 to the line neutral female receptacle and the line neutral conductor of the main supply. Ground continuity from the prong 28 is achieved through the ground conductor 18 to the high voltage generator 52.

This system assures that an operator holding and using dispensing device 58 will not be able to override the internal grounding features of system 10 by using a "dummy" plug between the male plug 22 and the female receptacle. It also assures that, should an interruption occur in the ground provided through prong 28, current automatically will cease flowing in relay coil 40, opening switches 42, 44 and stopping the flow of current to the high voltage generator 52. Additionally, lamp 46 will be energized, providing an indication of the ground interruption.

If the line "hot" conductor and line neutral conductor to the female receptacle in which plug 22 is placed are reversed, then prong 26 is coupled to the "hot" conductor and prong 24 is coupled to the neutral conductor. Current flow through prong 26 flows through resistor 50 to a line "hot" conductor 64. An associated full-wave bridge rectifier 66 rectifies the potential difference between line "hot" 64 and ground conductor 18, and stores this rectified potential across a capacitor 68. If ground conductor 18 is truly at ground potential through prong 28, the potential across capacitor 68 will be sufficient to cause a Zener diode 70 to conduct, permitting current to flow through a resistor 72 and a solenoid relay coil 74, through the rectifier 66 and back through ground conductor 18 to prong 28 of the male plug 22. Current flow through coil 74 closes switch 76, shorting the ground fault indicator lamp 46 from circuit. Current flow through coil 74 also closes switch 78 coupling power from the line "hot" conductor male prong 26 to generator 52 and back to the line neutral conductor male prong 24. Thus, operation of dispensing device 58 is properly maintained even when the line "hot" and line neutral conductors are inadvertently reversed in the female receptacle into which male plug 22 is plugged, as long as ground prong 28 is properly coupled to ground.

A parallel system is provided for use with a 110 VAC source. A circuit, or male plug, 80, including a line "hot" conductor prong 82, a line neutral prong 84, and a ground prong 86, is coupled in parallel with the circuit or 220 VAC male plug 22, including line "hot" prong 24, line neutral prong 26, and ground prong 28. The only difference between the connections made in these two circuits is that in the 110 VAC circuit, resistors 30, 50 are not necessary. Therefore, the conductors from prongs 82, 84 bypass resistors 30, 50 and are coupled directly to conductors 16, 64, respectively.

Zener diodes 90, 92 are coupled across coils 40, 74, respectively, to prevent exposure of these coils to excessive voltage and to damp any flyback pulses that may occur during operation of coils 40, 74.

What is claimed is:

1. A system for ensuring that a ground connection is made in a three-wire conductor system including a line "hot" conductor, a line neutral conductor, and a ground conductor including:
   means for utilizing current flowing between the line "hot" conductor and the line neutral conductor;
   a first circuit for coupling the utilization means to the "hot" and neutral conductors, the first circuit including a first switch;
   a second circuit for sensing the potential between the "hot" conductor and the ground conductor, the second circuit including a Zener diode for switching in response to the presence of voltage across the second circuit tending to indicate the presence of ground potential and means for operating the first switch when the Zener diode switches to couple the utilization means to the "hot" and neutral conductors.

2. The system of claim 1 and further comprising an indicator for indicating the presence or absence of ground, means for coupling the indicator across the "hot" and neutral conductors including a second switch, the means for operating the first switch also operating the second switch when the Zener diode switches to remove the indicator from circuit to indicate the presence of ground potential.

3. The system of claim 2 wherein the means for operating the first and second switches comprises a relay coil.

4. A system for ensuring that a ground connection is made in a three-wire conductor system including a line "hot" conductor, a line neutral conductor, and a ground conductor including:
   first means for generating a direct current potential related to the potential difference between the line "hot" conductor and ground;
   second means for generating a direct current potential related to the potential difference between the line "hot" conductor and ground;
   third means for providing a first contact for coupling alternatively to the line "hot" conductor or the line neutral conductor, a second contact for coupling alternatively to the line "hot" conductor or the line neutral conductor, and a third contact for coupling to the line ground conductor, coupling of the first contact to the line "hot" conductor causing the second contact to be coupled to the line neutral conductor and coupling of the first contact to the line neutral conductor causing the second contact to be coupled to the line "hot" conductor;
   fourth means for coupling the first means to the first and third contacts;
   fifth means for coupling the second means to the second and third contacts;
   the first and second means each including means for sensing the potential across the "hot" and ground conductors and for switching in response to the presence of potential difference which tends to indicate the presence of ground potential on the ground conductor;
   sixth means for utilizing current flow between the line "hot" conductor and the line neutral conductor;
   seventh means for coupling the utilization means to the line "hot" and neutral conductors, the seventh means including a switch;
   the first and second means each further including means for operating the last-mentioned switch when the means for sensing the potential across the "hot" and ground conductors and for switching in response to the presence of potential difference which tends to indicate the presence of ground potential on the ground conductor switches.

5. A system for ensuring that a ground connection is made in a three-wire conductor system including a line "hot" conductor, a line neutral conductor, and a ground conductor including:
   first means for generating a direct current potential related to the potential difference between the line "hot" conductor and ground;
   second means for generating a direct current potential related to the potential difference between the line "hot" conductor and ground;
   third means for providing a first contact for coupling alternatively to the line "hot" conductor or the line neutral conductor, a second contact for coupling alternatively to the line "hot" conductor or the line neutral conductor, and a third contact for coupling to the line ground conductor, coupling of the first contact to the line "hot" conductor causing the second contact to be coupled to the line neutral conductor and coupling of the first contact to the line neutral conductor causing the second contact to be coupled to the line "hot" conductor;
   fourth means for coupling the first means to the first and third contacts;
   fifth means for coupling the second means to the second and third contacts;
   the first and second means each including means for sensing the potential across the "hot" and ground conductors and for switching in response to the presence of potential difference which tends to indicate the presence of ground potential on the ground conductor.

6. The system of claim 5 and further comprising sixth means for utilizing current flow between the line "hot" conductor and the line neutral conductor; and
   seventh means for coupling the utilization means to the line "hot" and neutral conductors, the seventh means including a first switch;
   the first and second means each further including means for operating the first switch when the means for sensing the potential across the "hot" and ground conductors and for switching in response to the presence of potential difference which tends to indicate the presence of ground potential on the ground conductor switches.

7. The system of claim 4 or 6 and further comprising an indicator for indicating the presence or absence of ground, means for coupling the indicator across the "hot" and neutral conductors, the means for coupling the indicator across the "hot" and neutral conductors including a second switch, the means for operating the first switch also operating the second switch when the means for sensing the potential across the "hot" and ground conductors and for switching in response to the presence of potential difference which tends to indicate the presence of ground potential on the ground conductor switches to uncouple the indicator to indicate the presence of ground potential.

8. The system of claim 4 or 6 wherein the means for sensing the potential across the "hot" and ground conductors and for switching in response to the presence of potential difference which tends to indicate the presence of ground potential on the ground conductor comprises a Zener diode.

9. The system of claim 7 wherein the means for operating the first switch and second switch comprises a relay coil.

10. The system of claim 9 wherein one first switch, one second switch, and one relay coil are associated with each of said first and second means.

* * * * *